United States Patent [19]

Takahashi

[11] Patent Number: 4,769,657

[45] Date of Patent: Sep. 6, 1988

[54] FAULT DETECTION DEVICE FOR THERMAL PRINTING HEAD HEATING CIRCUITS

[75] Inventor: Kouetu Takahashi, Iwate, Japan

[73] Assignee: Kabushiki Kaisha Sato, Japan

[21] Appl. No.: 900,758

[22] Filed: Aug. 27, 1986

[30] Foreign Application Priority Data

Aug. 29, 1985 [JP] Japan .............................. 60-188616

[51] Int. Cl.[4] ........................ G01D 15/10; H05B 3/02

[52] U.S. Cl. .............................. 346/76 PH; 219/216; 219/482; 219/506

[58] Field of Search .................. 346/76 PH; 219/216, 219/506, 482; 400/120

[56] References Cited

U.S. PATENT DOCUMENTS 4,369,354 1/1983 Goedecke et al. .................. 219/506

4,500,893 2/1985 Sakura et al. .................. 346/76 PH 4,595,935 6/1986 Brooks et al. .................. 346/76 PH

FOREIGN PATENT DOCUMENTS 0174751 3/1986 European Pat. Off. ........... 400/120

*Primary Examiner*—E. A. Goldberg

*Assistant Examiner*—Gerald E. Preston

*Attorney, Agent, or Firm*—Ostrolenk, Faber, Gerb & Soffen

[57] ABSTRACT

A thermal printer with a fault detection circuit for detecting faults in heating elements used in the printer includes a print head containing the heating elements and a heating circuit associated with each element, a power supply, and a switching circuit interposed between the power supply and the print head. The fault detection circuit includes a current supply circuit, preferably a constant current source, which is connected in parallel to the switching circuit. A control circuit selects either a normal printing mode or a print head fault detection mode. In the fault detection mode, the switching circuit is disabled enabling the fault detection circuit to pass a test current through each of the heating elements for detecting any faults therein.

8 Claims, 3 Drawing Sheets

FAULT DETECTION DEVICE FOR THERMAL PRINTING HEAD HEATING CIRCUITS

BACKGROUND OF THE INVENTION

The present invention relates to a thermal print head and more particularly to a fault detection circuit adapted for detecting and isolating failures or faults in any of the heating elements or heating circuits contained in the thermal print head.

Conventional print heads of thermal printers contain a plurality of heating circuits, each comprised of a heating element and a gating circuit for controlling when electrical current passes through the heating element. Each gating circuit typically contains transistors, logic gates and the like. A failure in any one component of any given heating circuit will disable part of the dot matrix pattern that is output during printing, rendering the print head nonfunctional. The most frequent cause for failures results from circuit line breakage in the heating elements.

It has been proposed, as described for example in Japanese Laid-Open Patent Application No. 58 (1983) - 28391, to sequentially direct a low test current that is not high enough for printing, through each of the heating circuits. According to the method, a fault is detected if the current does not pass through any one of the heating circuits. The method is implemented with the aid of resistors having a low resistance value which are connected in series between the heating circuits and a common terminal side of the print head. When current is sequentially supplied to each of the heating circuits, a voltage across the resistors is sensed to determine whether current has passed through the heating circuits.

The above approach suffers from the drawback that in order to detect the very low test currents, an amplification circuit of a high amplification factor is needed to permit sensing of the test currents. Frequent adjusting of the amplification factor is also necessary. As a result, the testing circuitry becomes complicated and the time for completing a test is sufficiently long to constitute a real drawback of this checking process. Furthermore, because the testing relies on the value of the resistances and because manufacturing variations produce inconsistent resistance values in the heating elements themselves, it is necessary to carry out fine adjustment of the amplification factor for each thermal print head. It is difficult to simultaneously accommodate all of the variations in all of the resistances of all of the heating elements in any given thermal print head.

SUMMARY OF THE INVENTION

Accordingly, it is an object of the present invention to provide a fault detection circuit for a thermal print head which is simple in design and which enables a comparatively rapid completion of the checking process.

It is a further object of the invention to provide a fault detection circuit of the above type which does not require adjustment or calibration.

It is another object of the invention to provide a fault detection for a thermal print head which is operable notwithstanding the inconsistent resistance values of the heating elements associated with the print head.

The foregoing and other objects of the invention are realized according to the present invention in a printing system including a switching circuit disposed in-series between the print head which contains the heating circuits and their associated heating elements on one end and a power supply on the other end. A fault detection circuit for testing the heating circuits is disposed in parallel with the switching circuit with a controller being provided for selecting between a first mode when the switching circuit is enabled for normal printing operation and a second testing mode when the switching circuit is disabled and the fault detection circuit is enabled for carrying out its checking process.

In a preferred embodiment, the fault detection circuit of the present invention comprises a constant current source circuit connected in parallel with the switching circuit. A current detection circuit in the fault detection circuit detects whether current is supplied from the current source to the heating elements. In one embodiment, the current detection circuit is comprised of a photocoupler having a base which is driven by light from a photodiode connected in the current path to the heating elements, a collector coupled to a sensing circuit, and a grounded emitter. Depending on the current passing through the diode, the collector voltage varies, enabling current detection.

Other features and advantages of the present invention will become apparent from the following description of a preferred embodiment of the invention provided in reference to the following drawings.

DESCRIPTION OF A PREFERRED EMBODIMENT

Figure 1:
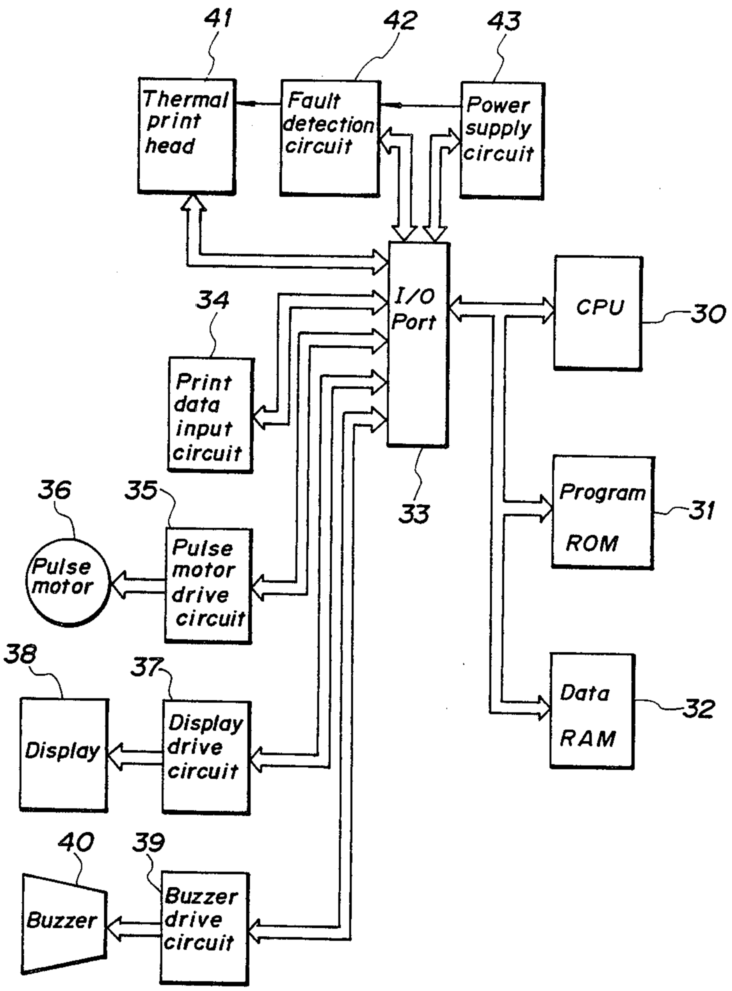
FIG. 1 is a block diagram of a thermal printer having a thermal print head with heating circuits and a fault detection circuit according to the present invention.

FIG. 1 illustrates a CPU 30 which is coupled to a program ROM 31, a data RAM 32 and an I/O port 33. Overall control of all printer functions, including printing and control of fault detection functions is through CPU 30 based on program steps that are stored in program ROM 31. RAM 32 is used for storing printing data, the location or identity of faulty heating circuits derived from the checking process and various other data necessary for operating the thermal printer.

CPU 30 interfaces and controls a variety of peripheral equipment contained in the thermal printer system through I/O port 33. I/O port 33 is interfaced to a print data input circuit 34 through which data to be printed is inputted; a drive circuit 35 for driving a pulse motor 36 provided for transporting printing paper; a drive circuit 37 for driving display 38, for example a CRT; a drive circuit 39 for actuating a buzzer 40; and a thermal print head 41. Power supply 43 supplies power to print head 41 through fault detection circuit 42. Both fault detection circuit 42 and power supply 43 are connected to I/O port 33 so that both are either monitored by of under control of CPU 30 in accordance with the program that is stored program ROM 31.

Figure 2:
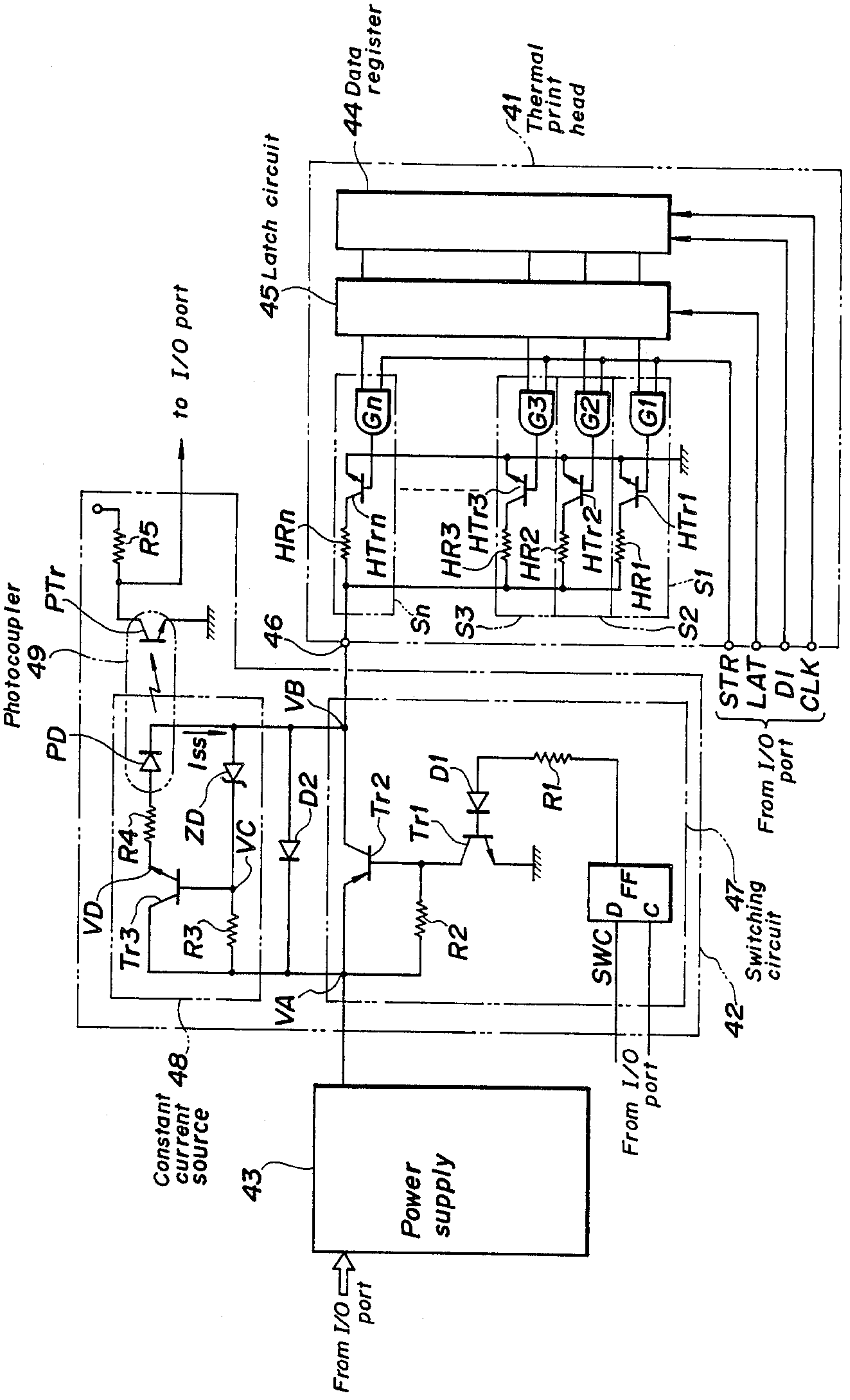
FIG. 2 is a circuit diagram showing the main components of the present invention.

Components of print head 41, fault detection circuit 42 and power supply 43 are shown in greater detail in FIG. 2. Thus, print head 41 includes data register 44 which is constructed of shift registers, a latch circuit 45, and "n" heating circuits S1, S2, S3 . . . Sn. Each one of heating circuits S1, S2, S3 . . . Sn is comprised of AND gates G1, G2, G3 . . . Gn, transistors HTr1, HTr2, HTr3 . . . HTrn, and heating elements HR1, HR2, HR3 . . . HRn.

A single line of dots is stored in data register 44, the data being inputted to data register 44 through data input DI which supplies one data bit at a time via I/O port 33 for each pulse of clock signal CLK. Latch circuit 45 is coupled to data register 44 and data in data register 44 is latched or stored into latch circuit 45 each time latch signal LAT is activated via I/O port 33.

Each of the output lines of latch circuit 45 is connected to a respective input terminal of AND gates G1, G2, G3 . . . Gn. A second input terminal of the AND gates G1, G2, G3 . . . Gn is connected to a strobe signal STR that is provided from I/O port 33. The outputs of AND gates G1, G2, G3 . . . Gn are connected to the bases of transistors HTr1, HTr2, HTr3 . . . HTrn. The emitters of the transistors are grounded and their collectors are connected to respective ones of heating elements HR1, HR2, HR3 . . . HRn. A common terminal 46 through which power is supplied to print head 41 serves as a common terminal for the other end of the heating elements. Power supply 43 supplies needed electric power to print head 41 which power is controlled to provide an output voltage which is varied by means of the HV input of I/O port 33.

With the constant current source 48 described below, it is unnecessary to vary the output voltage. Fault detection circuit 42 is comprised in part of switching circuit 47 which is connected between print head 41 and power supply 43 and constant current source 48 which is disposed in parallel with switching circuit 47.

Switching circuit 47 includes D type flip-flop FF, transistors Tr1, Tr2, resistors R1, R2, and diode D1. Switch control signal SWC which is outputted from CPU 30 is connected to the D terminal of flip-flop FF. CPU 30 also supplies, through I/O port 33, a clock signal which is connected to the C (clock) terminal of flip-flop FF. The operation of flip-flop FF is such that when the control signal SWC is high during an active phase of the clock period the output flip-flop FF goes high and vice versa. The output terminal of flip-flop FF is connected to the base of transistor Tr1 through resistor R1 and diode D1. The emitter and collector of transistor Tr1 are connected respectively to ground and to the base of transistor Tr2. The emitter and collector of transistor Tr2 are in turn connected, respectively, to an output terminal VA of power supply circuit 43 and to common terminal 46 associated with print head 41. Resistor R2 shunts the base and emitter of transistor Tr2.

Operation of switching circuit 47 is such that when the output of flip-flop FF is high, transistors Tr1 and Tr2 are both conductive and electrical power is supplied directly from power supply 43 to common terminal 46 and then to print head 41. When the output is low, transistors Tr1 and Tr2 are off and power from power supply 43 is directed to common terminal 46 via constant current source 48.

Constant current source 48 includes transistors Tr3, resistors R3, R4 and Zener diode ZD. Photodiode PD is part of photocoupler 49 and is connected in series in the path of current that is generated by constant current source 48. In the embodiment of FIG. 2, the collector of transistor Tr3 is connected to the output terminal of power supply 43 and its emitter is connected to common terminal 46 via resistors R4 and photodiode PD. Resistor R3 is located between the base and collector of transistor Tr3 while the anode of Zener diode ZD is connected to common terminal 46 and its cathode is connected to the base of transistor Tr3.

The electrical potentials VC and VD of constant current source 48 are approximately equal for the obvious reason that they are separated by the very low $V_{be}$ voltage of transistor Tr3. Since the potential difference between the anode and cathode of Zener diode ZD (VC—VB) is constant, the voltage potential between VB and VD remains constant even if VB changes owing to a change in the VA potential or in the resistance of any of heating elements HR1, HR2, HR3 . . . HRn. $I_{ss}$, the current flowing in the photodiode PD, stays constant and the photocoupler 49 operates stably and at a high speed.

PTr comprises the phototransistor component of photocoupler 49. Its emitter is grounded and its collector is connected through resistor R5 to a high electrical potential, for example to power source 43. The collector of phototransistor PTr is further connected to I/O port 33 and made available to CPU 30 as an input line which enables CPU 30 to carry out fault detection by sensing the logic level of the input line.

In operation, when transistor Tr2 of switching circuit 47 is in an OFF state, current from power supply 43 is directed to print head 41 via constant current source 48. By controlling the bit pattern in latch circuit 45 to assure that current is constrained to flow only to one heating circuit at a time, it is possible to determine, by sensing whether current does indeed issue from the current source, whether any given heating circuit is in good operating condition. Thus, if current $I_{ss}$ flows through photodiode PD, the collector of phototransistor PTr will be clamped to ground while when the current does not flow the transistor will be in an OFF state and the voltage at the collector of the PTr will be high. CPU 30 is capable therefore of sensing a circuit fault if the voltage at the collector of the phototransistor goes high when it is expected to be low. Thus, a fault detection circuit according to the present invention is realized with the simple addition of the constant current source 48, photocoupler 49 and resistor R5 to the printer head assembly. Diode D2 connected between common terminal 46 and the output of power supply 43 serves to protect transistor Tr2 of switching circuit 47 and constant current source 48.

Figure 3:
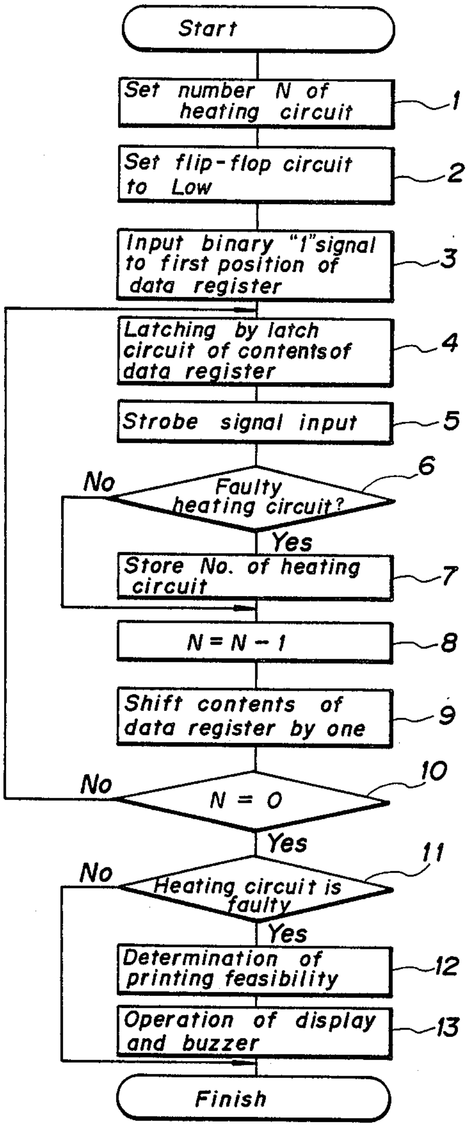
FIG. 3 is a flow chart depicting testing steps that are sequentially carried out in the fault detection circuit of the present invention.

Reference should now be had to the flow chart of FIG. 3 which illustrates the program steps that are carried out within CPU 30 during a checking phase in the operation of the printer of the present invention.

In Step 1, the total number of heating circuits S1, S2, S3 . . . Sn, equalling the total number of dots N in print head 41, is stored in a predetermined address of data RAM 32. Thereafter, in step 2, switch control signal SWC is set to a low logic level and the clock signal is actuated to set the output of flip-flop FF to a low logic state. As a result, transistors Tr1 and Tr2 are turned off. In the next step, input data line DI is set to high value and the clock signal CLK is actuated momentarily. As a result, a binary "1" is stored in the first stage of data register 44 (which is constituted of a shift register).

Thereafter, in step 4, latch signal LAT is activated momentarily whereby the contents of data register 44 are transferred to latch circuit 45. When, in addition, stroke signal STR is activated, AND gate G1 will output a high output which will activate transistor HTr1 permitting heating current to flow in heating circuit S1. During this time current is expected to flow so that CPU 30 which monitors the collector of phototransistor PTr expects a low logic level. If a high logic level is detected, heating circuit S1 is defective. In other words, since the collector is at a high level, the implication is that current $I_{ss}$ is not flowing through heating circuit S1 due to a circuit line break or the like. If heating circuit S1 was in good condition, current $I_{ss}$ from constant current source 48 would flow causing light to be emitted from photodiode PD which would then activate phototransistor PTr, pulling the collector to ground.

If it is determined in step 6 that no fault exists, the program proceeds to step 8. On the other hand if a fault is detected, a predetermined respective value assigned to that heating circuit is stored at a specific location in data RAM 32. The count value N can be used for identifying the heating circuits. In step 8, the count N is decremented to indicate the next heating circuit that will be tested. Then, in step 9, another clock pulse is output on clock signal CLK while the input data DI which is applied to data register 44 is maintained at a low logic level. Therefore, the binary "1" signal is shifted from the first to the second position of data register 44. This enables only the second heating circuit, namely heating circuit S2.

However, before proceeding with the next test step, step 10, the value N is compared to zero. If it is not zero, the test continues by repeating the procedures of steps 4 through 10, substantially as described above. When the last heating circuit, namely heating circuit Sn, will have been tested N will be zero and the process then proceeds to step 11.

In step 11, it is determined whether a faulty heating circuit was detected. If none was found, the testing phase is terminated and printing or other normal functions are begun. If on the other hand, a faulty heating circuit was found, the data that was stored in relation to the faulty heating circuit is examined to determine the extent and number of faulty heating circuits and a determination is made whether printing is possible notwithstanding the faults.

Finally, in step 13, display 38 is used to display a message thereon to indicate whether printing is possible and further showing the number and/or identity of faulty heating circuits. A buzzer is then sounded to signal the completion of the heating circuits fault detection operation.

Since the focus of the present invention is on a fault detection circuit for a thermal printer, the basic thermal printer is not described other than to note that the testing phase is concluded by setting the switch control signal SWC to a high level and outputting a clock signal to flip-flop FF to cause its output to go high whereby transistors Tr1 and Tr2 will be enabled to conduct power from power supply 43 to common terminal 46 of print head 41 as required for normal operation.

While in the above described embodiment the fault detection circuit was described as being comprised of a constant current source in conjunction with a photocoupler, the emitter of which provides a constant current, it is also possible to provide a constant current source through a fixed resistance. The testing process involves measuring or noting the current flowing through the fixed resistance in a manner that is familiar to persons skilled in the art. Under such an arrangement, current should not be supplied to the print head during normal operation and therefore a relatively high resistance should be employed. For the same reason, an amplification circuit for the resistor need not be of the high amplification variety as in the prior art nor is a fine tuning or calibration circuit required since the voltage across the high resister will be high enough to permit measurements of the voltage across the resistor with relative ease.

Note too that whenever a constant current source is used for the fault detection circuit, the supply voltage need not be set at a very exact value and therefore no specific fine regulation of the power source voltage is needed.

Using another approach, it is possible to connect a comparator of the type having an output which is at a low logic level when the potential of the common terminal of the print head is within a predetermined range and at a high logic level when that voltage is outside that range. As in previous embodiments, the output of the comparator would be supplied to I/O port 33 to enable CPU 30 to detect heating circuit line breaks, short-circuits, and circuit resistant anomalies. It is to be noted generally for the above-described embodiments thyristors or the like may be used instead of the transistors shown in the Figures.

By way of summary, the invention as described above focuses on a fault detection system wherein a switching circuit is located between the print head and the power supply for the print head. In parallel with the switching circuit is provided the fault detection circuit and controlling means which are capable of selectively disabling the switching circuit as is needed for carrying out a fault detection checking process. Therefore, the present invention does not require a high amplification circuit or fine adjustment means as conventionally provided in prior art. The circuitry and operation thereof are therefore extremely simple and inexpensive. Furthermore, the fault detection process is carried out at a high speed, increasing its commercial utility and attractiveness.

Furthermore, the employment of a constant current scheme for supplying test current to the print head is insensitive to variations in the particular resistances in the heating elements as a constant current is supplied at all times. Therefore the emitter for coupler 49 will function consistently and reliably. Thus, by measuring the potential at the common terminal of the printing head, detection of heating circuit line breaks, short-circuits, and circuit resistance anomalies is possible.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. a fault detection circuit for a thermal printer, comprising:

a print head having heating circuits therein;

a power supply for supplying electrical power to the print head;

a switching circuit disposed in series circuit relationship between the power supply and the print head, and a control circuit coupled to the switching circuit for selectively enabling the switching circuit to switch the electrical power to the print head;

a separate current supplying circuit connected in parallel with the switching circuit, the current supplying circuit comprising a constant current source connected in series between said power supply and said print head, said constant current source delivering to said print head a substantially constant current irrespective of variations in the magnitude of said electrical power of said power supply or resistance values associated with said heating circuits; and a photocoupler in the current supplying circuit, the photocoupler being effective for indicating whether or not current flows from the constant current source to the print head, the photocoupler being constituted of a photodiode connected in series with the constant current source and a phototransistor having an output which varies in response to the current flowing in the photodiode.

2. The fault detection circuit of claim 1, further comprising a CPU for controlling and monitoring the operation of the control circuit, the constant current source and the print head.

3. The fault detection circuit of claim 2, in which the switching circuit comprises a semiconductor device which is effective for controlling the flow of the electrical power to the print head and a control semiconductor in the control circuit for selectively enabling the semiconductor device of the switching circuit in response to control signals from the CPU.

4. The fault detection circuit of claim 1, in which the print head comprises a predetermined number of the heating circuits and a semiconductor storage device for controlling respectively and individually an ON/OFF state of each of the heating circuits, means for controlling the contents of the semiconductor storage device in response to control signals from the CPU.

5. The fault detection circuit of claim 1, further comprising means for selectively and sequentially enabling each of the heating circuits on a mutually exclusive basis and for determining whether current is conducted to the enabled heating circuit to determine the operational integrity of each one of the heating circuits.

6. The fault detection circuit of claim 1, further comprising display means for indicating thereon whether a fault condition exists in relation to the print head.

7. The fault detection circuit of claim 1, further comprising a display device for indicating thereon whether a fault condition is associated with the print head and the identity of heating circuits which have been found defective.

8. The fault detection circuit of claim 1 further comprising a Zener diode in said constant current source for controlling said constant source to deliver said substantially constant current.

* * * * *